Patented May 2, 1933

1,906,833

UNITED STATES PATENT OFFICE

KARL BAUR, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY

PRODUCTION OF ALDEHYDES AND KETONES

No Drawing. Application filed February 28, 1931, Serial No. 519,249, and in Germany March 24, 1930.

The present invention relates to the production of aldehydes and ketones.

In the application for Letters Patent Ser. No. 424,720, filed January 30, 1930, applicant has described a process for the production of aldehydes from 1.2-oxides of hydrocarbons containing from 2 to 4 carbon atoms or mixtures thereof with 2.3-oxides according to which the 1.2-oxides, or mixtures are led in the vapor phase at elevated temperatures over catalysts which contain the oxygen containing acids of the elements of the 5th or 6th group of the periodic system or anhydrides or salts of these acids alone or in admixture with one another or with oxides, hydroxides or carbonates.

I have now found that in the catalytic manufacture and production of aldehydes from 1.2-oxides of hydrocarbons, or mixtures thereof with 2.3-oxides, catalysts which consist of or essentially contain halides, including oxy-halides, of the alkaline earth metals, such as calcium, barium or strontium including beryllium and magnesium, or mixtures of the same with each other or with other substances, as for example with the activators or stabilizing agents or the catalysts specified in the aforesaid application No. 424,720 are distinguished by an excellent activity and stability. Suitable catalytic agents are for example calcium fluoride, barium bromide, magnesium oxychloride, or calcium chloride, barium chloride, barium iodide, barium fluoride or the corresponding salts of strontium, magnesium or beryllium.

The catalysts may be employed as such or deposited on granular carriers or in intimate mixture with metallic, mineral or ceramic materials such as pumice meal, clay, kieselguhr, glass powder, graphite meal and the like. The reaction is usually carried out at atmospheric or reduced pressure in the gaseous phase, but comparatively increased pressures up to about 50 atmospheres may also be employed. It is preferable to employ reaction temperatures of between 200° and 450° C.; the optimum output is in most cases at a temperature of from 280° to 360° C. The vaporized 1.2-oxides may be led over the catalysts alone; in some cases, however, for example when a fresh and/or highly active catalyst is employed in order to prevent the catalyst from becoming unduly hot by the exothermic reaction it is advantageous to mix inert gases such as nitrogen or carbon dioxide, or water vapor with the oxide vapors in an amount of between 1 and 30 times, by volume, that of the oxide vapors; thus, for example carbon dioxide or nitrogen may be continuously or periodically added to the 1.2-oxide vapors for carrying off the excess of heat from the reaction space. In addition to aldehydes and ketones valuable by-products, especially unsaturated aldehydes are obtained.

The following examples will further illustrate the nature of this invention, but the invention is not restricted to these examples.

*Example 1*

Barium bromide is heated to 350° C. in a current of air, ground in a ball mill and intimately mixed with half of its weight of kieselguhr, and shaped into granules. Vapors of propylene oxide are led with a velocity of about 100 grams per liter of the catalyst per hour over the said granules in a vessel at a temperature of from 330° to 350° C. By cooling a condensate having a content of about 55 per cent of propionaldehyde and about 25 to 30 per cent of acetone is obtained.

*Example 2*

A mixture of equal parts of water-insoluble magnesium oxychloride containing 18.6 per cent of magnesium and 32 per cent of chlorine, magnesium ammonium phosphate and bleaching earth is triturated into powder and heated in a current of air at 350° C. for some time. The mixture is then moulded into granules and a mixture of equal parts by volume of vapors of propylene oxide and nitrogen is passed over the granules heated to 300° C. A condensate can be recovered which contains about 60 per cent of propionaldehyde and about 15 per cent of acetone.

*Example 3*

Vapors of commercial butylene oxide, consisting of about 50 per cent of iso-butylene oxide, 20 per cent of 1.2-butylene oxide and 30 per cent of 2.3-butylene oxide, are passed at 300° C. over a granulated mass consisting of equal parts by weight of calcium fluoride, barium fluoride and kieselguhr. On cooling the effluing vapors a condensate is obtained 55 per cent of which is iso-butyraldehyde and n-butyraldehyde and which contains methyl ethyl ketone and unsaturated aldehydes and alcohols.

What I claim is:—

1. In the catalytic production of aldehydes and ketones from 1.2-oxides of hydrocarbons containing from 2 to 4 carbon atoms, the step which comprises passing the vapors of said oxides while heating from 200° to 450° C. over a catalyst essentially comprising a halide of an alkaline earth metal.

2. In the catalytic production of aldehydes and ketones from 1.2-oxides of hydrocarbons containing from 2 to 4 carbon atoms, the step which comprises passing the vapors of said oxides while heating to from 200° to 450° C. over a catalyst essentially comprising an oxy-halide of an alkaline earth metal.

3. In the catalytic production of aldehydes and ketones from mixtures of 1.2-oxides containing from 2 to 4 carbon atoms and 2.3-oxides of such hydrocarbons, the step which comprises passing the vapors of said oxides while heating to from 200° to 450° C. over a catalyst essentially comprising a halide of an alkaline earth metal.

4. In the catalytic production of aldehydes and ketones from 1.2-propylene oxide, the step which comprises passing the vapors of said oxide while heating to from 200° to 450° C. over a catalyst essentially comprising a halide of an alkaline earth metal.

5. In the catalytic production of aldehydes and ketones from 1.2-oxides of hydrocarbons containing from 2 to 4 carbon atoms, the step which comprises passing the vapors of said oxides while heating to from 280° to 360° C. over a catalyst essentially comprising magnesium oxychloride.

6. In the catalytic production of aldehydes and ketones from 1.2-oxides of hydrocarbons containing from 2 to 4 carbon atoms, the step which comprises passing the vapors of said oxides while heating to from 200 to 450° C. over a catalyst essentially comprising barium bromide.

In testimony whereof I have hereunto set my hand.

KARL BAUR.